(12) United States Patent
Blyde et al.

(10) Patent No.: US 9,806,544 B2
(45) Date of Patent: Oct. 31, 2017

(54) MEDICAL DEVICE BATTERY CHARGE INDICATOR

(71) Applicant: Draeger Medical Systems, Inc., Andover, MA (US)

(72) Inventors: Susan M. Blyde, Stoneham, MA (US); Celestino Raul Morales, Lynn, MA (US); Shuyi Xu, Lexington, MA (US); Tim Coonahan, Sterling, MA (US); Georgios Kokovidis, Waltham, MA (US)

(73) Assignee: Draeger Medical Systems, Inc., Andover, MA (US)

( * ) Notice: Subject to any disclaimer, the term of this patent is extended or adjusted under 35 U.S.C. 154(b) by 176 days.

(21) Appl. No.: 14/933,841

(22) Filed: Nov. 5, 2015

(65) Prior Publication Data

US 2017/0047748 A1   Feb. 16, 2017

Related U.S. Application Data

(60) Provisional application No. 62/205,514, filed on Aug. 14, 2015.

(51) Int. Cl.
*H01M 10/44* (2006.01)
*H01M 10/46* (2006.01)
*H02J 7/00* (2006.01)

(52) U.S. Cl.
CPC .......... *H02J 7/0021* (2013.01); *H02J 7/0027* (2013.01); *H02J 7/0047* (2013.01); *H02J 2007/005* (2013.01); *H02J 2007/0096* (2013.01)

(58) Field of Classification Search
CPC .......... H02J 7/0021; H02J 7/0047; H02J 7/355
USPC .......... 320/107, 114, 115, 132, 149, DIG. 18, 320/DIG. 21; 340/635; 702/63, 64
See application file for complete search history.

(56) References Cited

U.S. PATENT DOCUMENTS

| 5,406,188 A  * | 4/1995 | Myslinski ............. H02J 7/0047 320/DIG. 18 |
| 5,712,795 A  * | 1/1998 | Layman ................ A61M 5/142 307/64 |
| 6,625,552 B1 * | 9/2003 | Delvecchio ........ G01R 31/3682 320/132 |
| 8,255,176 B2 * | 8/2012 | Plestid ............... G01R 31/3679 320/128 |
| 2007/0250653 A1* | 10/2007 | Jones ................ G06F 17/30578 710/303 |
| 2009/0168088 A1* | 7/2009 | Rosenblatt ............. B65D 75/52 358/1.12 |
| 2016/0004511 A1 | 1/2016 | Lu et al. |
| 2016/0045111 A1 | 2/2016 | Menzel |

* cited by examiner

*Primary Examiner* — Edward Tso
(74) *Attorney, Agent, or Firm* — Jones Day (57) ABSTRACT

A charging device receives charge data from a device connected to the charging device. The charge data corresponds to an amount of stored energy in a battery connected to the device. A charge level for the device is determined based on the received charge data. An interface forming part of the device displays the determined charge level such that (i) a visual representation of the charge level is displayed in a first orientation when the charge level is less than a threshold value and (ii) the visual representation of the charge level is displayed in a second orientation when the charge level is greater than or equal to the threshold value.

23 Claims, 8 Drawing Sheets

MEDICAL DEVICE BATTERY CHARGE INDICATOR

RELATED APPLICATION

The current application claims priority to U.S. Pat. App. Ser. No. 62/205,514 filed on Aug. 14, 2015, the contents of which are hereby fully incorporated by reference.

TECHNICAL FIELD

The subject matter described herein relates to the charging of electronic devices, specifically the charging of batteries used in medical devices.

BACKGROUND

Medical devices requiring portable power supplies, for example batteries, are ubiquitous in modern medical treatment facilities. Medical devices may have their power supplies fully integrated into the medical device, whereas other medical devices may have removable power supplies. Either the medical devices themselves or batteries used for them need to be recharged or changed as a result of use. Medical devices and/or batteries can be placed in charging devices in order to replenish the stored charge. There can be an indication on the medical device, the charging device, the battery, etc. of the level of charge contained in the medical device or battery.

SUMMARY

In one aspect, a charging device receives charge data from a device connected to the charging device. The charge data corresponds to an amount of stored energy in a battery connected to the device. A charge level for the device is determined based on the received charge data. An interface forming part of the device displays the determined charge level such that (i) a visual representation of the charge level is displayed in a first orientation when the charge level is less than a threshold value and (ii) the visual representation of the charge level is displayed in a second orientation when the charge level is greater than or equal to the threshold value.

In an interrelated aspect, a medical device generates charge data corresponding to an amount of stored energy in a battery connected to the medical device. The medical device determines a charge level for the medical device, based at least on the charge data. The determined charge is displayed in an interface forming part of the medical device level such that a visual representation of the charge level is displayed in a first appearance when the charge level is less than a threshold value and the visual representation of the charge level is displayed in a second appearance when the charge level is greater than or equal to the threshold value.

In an interrelated aspect, charge data is received by charging device from a medical device operatively connected to the charging device. The charge data corresponds to an amount of stored energy in a battery operatively connected to the medical device. A charge level is determined for the medical device based on the received charge data. The determined charge level is displayed in an interface forming part of the medical device such that a visual representation of the charge level is displayed in a first appearance when the charge level is less than a threshold value and the visual representation of the charge level is displayed in a second appearance when the charge level is greater than or equal to the threshold value.

In some variations, the device can be a medical device configured to measure a physiological condition of a patient and/or facilitate a medical treatment for the patient.

A visual appearance of the visual representation in the first orientation can differ from a visual appearance of the graphical element in the second orientation. The visual representation can be line on the interface of the device. The line can be horizontal on the interface of the device when the charge level is less than the threshold value and vertical on the interface of the device when the charge level is greater than or equal to the threshold value. The threshold value can be approximately 100% of the maximum stored energy of the battery. The visual representation can move across the interface.

There can be a number of devices coupled to the charging device, and only the devices that have charge levels that are greater than or equal to the threshold value display the visual representation. There can be a number of devices coupled to the charging device, and only the device that is most charged displays the visual representation. There can be a number of devices coupled to the charging device, and for each of the devices, when the charge level is below a first threshold value, no visual representation is displayed on the interface, when the charge level is between the first threshold value and a second threshold value, the visual representation can include a line having a first color on the interface, when the charge level is between the second threshold value and the third threshold value, the visual representation can include the line on the interface having a second color, and when the charge level approximately at or greater than the third threshold value, the visual representation can include the line on the interface having a third color, and when the charge level is greater than the first threshold value, the visual representation can include a numerical indication of the charge level proximate to the visual representation. The first color can be red, the second color can be yellow, and the third color can be green. The displaying can be further based upon the charge level being approximately at or above at least one of a first threshold value, a second threshold value, and a third threshold value. The first threshold value can be approximately 50% of the maximum stored energy of the battery, the second threshold value can be approximately 75% of the maximum stored energy of the battery, and the third threshold value can be approximately 100% of the maximum stored energy of the battery.

There can be a number of devices coupled to the charging device, where the determining can further include receiving, by each of the devices connected to the charging device, the charge data corresponding to the other devices connected to the charging device. The displaying, by each of the devices, can further be based upon on the received charge data from the other devices. There can be a number of devices coupled to the charging device and at least a portion of the devices can be connected by a network. The determining can be by the charging device and the displaying can be based on a command received by the device from the charging device.

The visual representation can include a line with an orientation that changes between the first appearance and the second appearance.

Implementations of the current subject matter can include, but are not limited to, methods consistent with the descriptions provided herein as well as articles that comprise a tangibly embodied non-transient machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can provide one or more technical advantages. For example, clinical workflows are made more efficient because the charge level of a medical device or battery can be easily displayed to caregivers, which in turn, allows such caregivers to quickly select the medical device with the highest charge level. Also, the visual representation displayed by a medical device can vary with the level of charge of the medical device also enhancing clinical workflow efficiency.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a battery charge indicator, it should be readily understood that such features are not intended to be limiting unless otherwise specified. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The current subject matter is directed to a charging device that easily communicates the charging status of connected medical devices and/or batteries to a user. These medical devices can, for example, be devices for measuring a physiological condition of a patient, and may be used in connection with the treatment and/or care of a patient and can each include at least one battery for providing power. When a medical device is described as being charged in a charging device, it is to be understood that it is the battery in the medical device that is being charged, even if the medical device is what is directly coupled to the charging device. Thus, a battery and a medical device, when operatively connected to the charging device, are said to be charging via the charging device. Moreover, if only batteries are being charged, without any medical devices present, the features described herein apply in an equivalent manner unless otherwise stated. While the current subject matter is described in connection with medical devices, it will be appreciated that the current subject matter can apply to other types of battery-powered electronic devices including trace gas detectors and other measurement systems.

Figure 1:
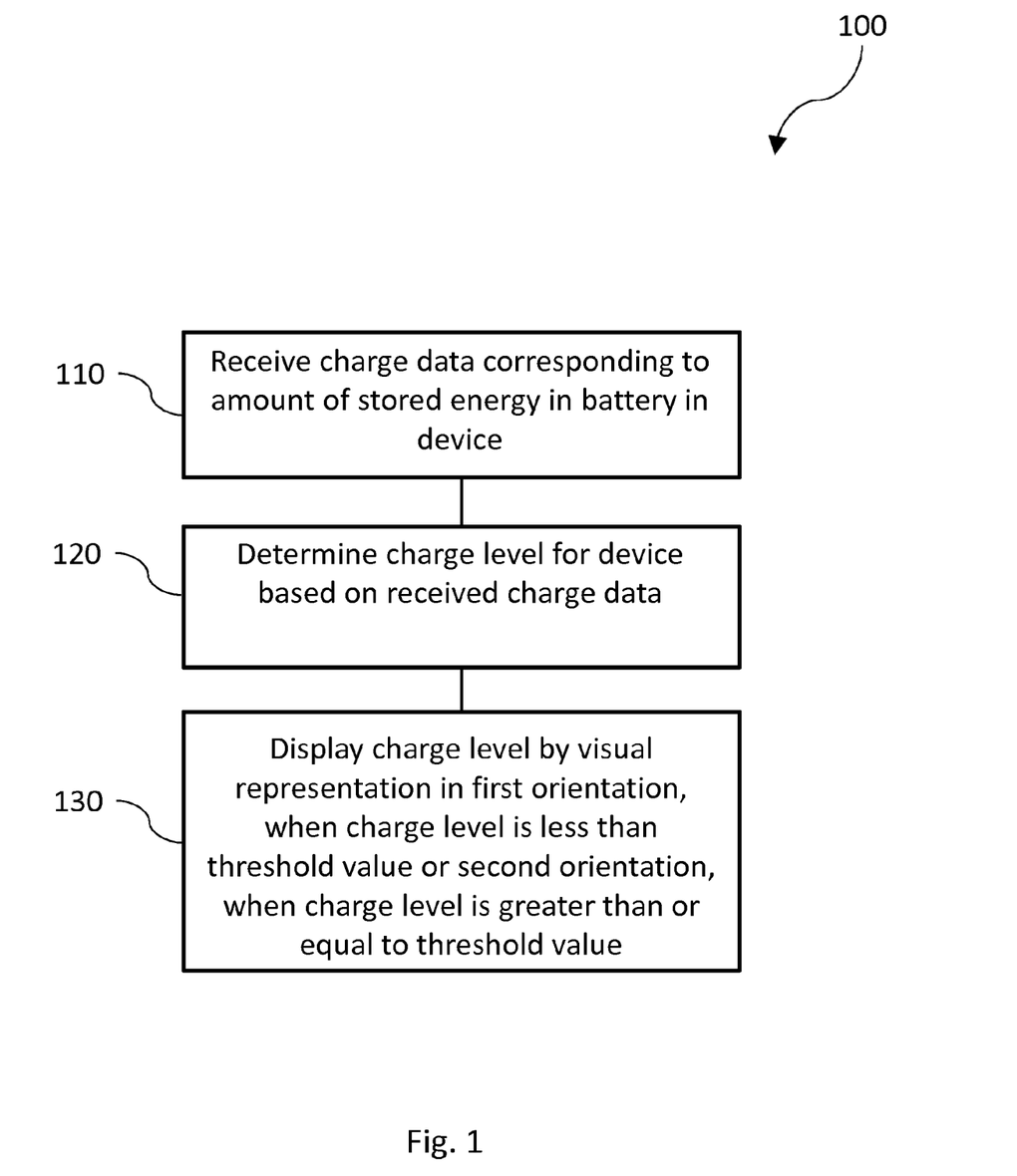
FIG. 1 is a process flow diagram illustrating displaying the charge level of a battery connected to a medical device.

FIG. 1 is a process flow diagram 100 illustrating displaying the charge level of a battery connected to a medical device. At 110, charge data can be received from a medical device connected to the charging device. The charge data can correspond to an amount of stored energy in a battery connected to the medical device. The charge data can be, for example, a representation of the amount of stored energy, expressed as, for example, as a voltage, resistance, or impedance of a connected medical device. The charge data can be stored and/or transmitted by the medical device and/or device charger as digital data or an analog signal.

At 120, a charge level can be determined for each medical device operatively connected to the charging device. The determination of the charge level can be based in part on the received charge data. The charge level can refer to the amount of stored energy in a particular medical device. For example, a charge level of 0% represents a fully depleted medical device, while a charge level of 100% represents a fully charged medical device. The charge level can be compared between two or more batteries and/or medical devices. For example, if there are multiple medical devices connected to one or more charging devices, then the medical device that has the highest charge level can be designated as the "most charged." Medical devices can be ranked or recorded according to their charge level. Charge level can also be used to differentiate between different estimated lifetimes based on the charge levels of each medical device. For example, a small battery, even if fully charged, can provide less operating time to a medical device than a larger, but partially charged, battery. Accordingly, the charge level can, in some implementations, reflect which batteries or medical devices will provide the longest operating lifetime.

At 130, an interface forming part of the medical device can display the determined charge level with a visual representation. The visual representation can change in appearance and/or orientation based on the charge level determined at 120. The visual representation can be displayed in a first orientation when the charge level is less than a threshold value. The visual representation of the charge level can be displayed in a second orientation when the charge level is greater than or equal to the threshold value. The visual representation can be, for example, a bar or line, a flashing element, an LED, etc. Further examples and details of implementations of the displaying of the charge level are described in FIGS. 2-8.

Figure 2:
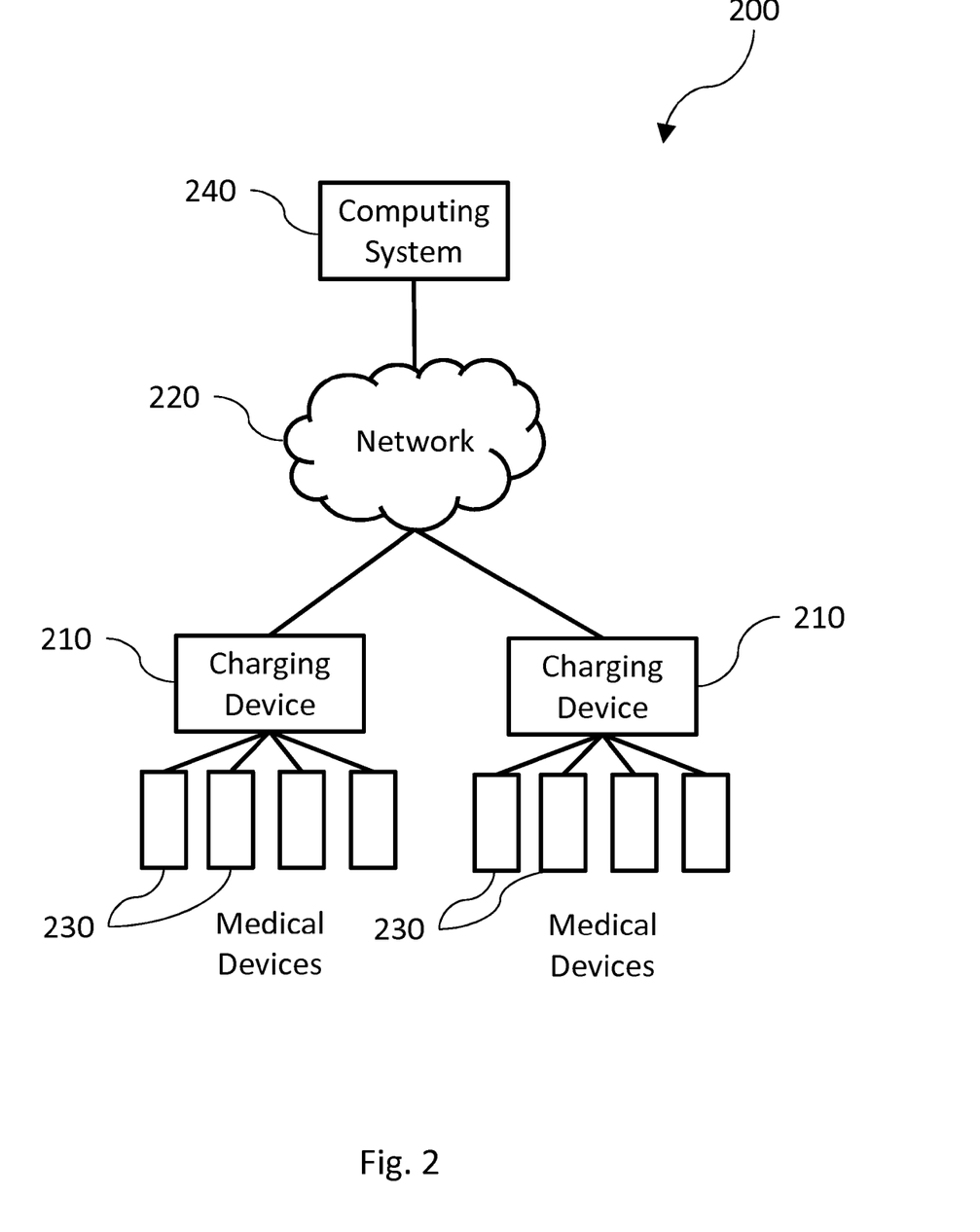
FIG. 2 is a diagram illustrating a system having multiple charging devices connected via a network.

FIG. 2 is a diagram illustrating a system 200 having multiple charging devices 210 connected via a network 220. Multiple charging devices 210 can be used throughout a facility, for example a hospital, nursing home, etc. to provide convenient access to charged medical devices 230 by caregivers. Each of the charging devices 210 can have multiple medical devices 230 connected to them in various states of charge. Furthermore, the charging devices 210 and/or medical devices 230 can communicate with each other, as well as to at least one computing system 240, via a network 220. The network connection can be, for example, a LAN, VLAN, Bluetooth (e.g., BLE), WiFi, etc. Examples of computing systems can include mobile devices, notepad computers, desktop computers, caregiver workstations, personal desktop computers, centralized databases, etc. Because the medical devices 230 can be networked, the charge statuses of the medical devices 230 can be stored or accessed from any connected system. This can allow easy location and identification of fully charged medical devices 230 or of medical devices 230 that are not sufficiently charged for use.

Figure 3:
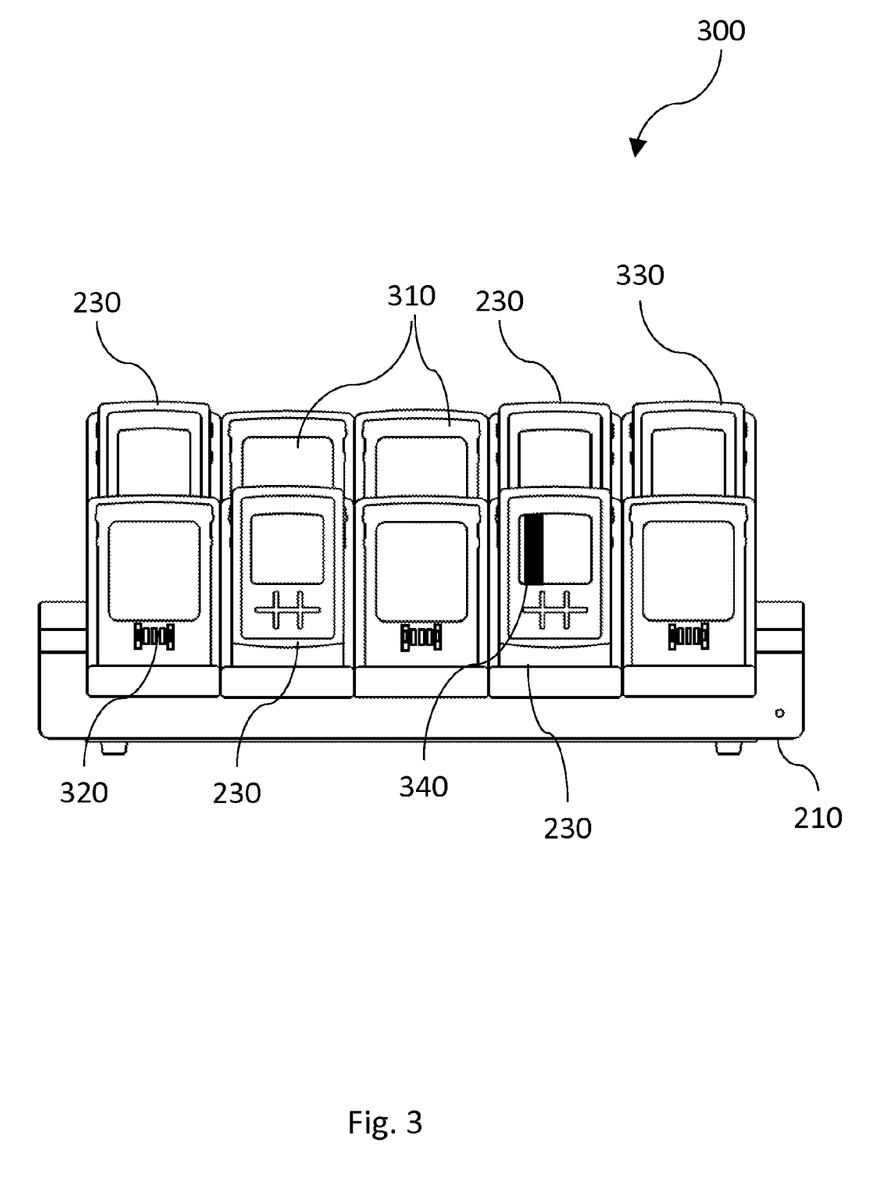
FIG. 3 is a diagram illustrating a charging device having multiple docks for medical devices.

FIG. 3 is a diagram 300 illustrating a charging device 210 having multiple docks 310 for medical devices 230. The medical devices 230 can be any type of medical device, for example, a patient monitor, device monitor, ventilators, CPAP devices, infusion pumps, mini-insulin refrigerators, $SpO_2$ monitors, etc. Each of the medical devices shown in FIGS. 3-8 can also include an interface 330. The interface 330 can be any sort of interface capable of displaying or visualizing data in a visual manner, for example, an LCD screen, touchscreen, plasma screen, etc. The visual representation 340 can be displayed on the interface 330 as described herein and in the figures. Here, an example of the visual representation 340 is shown by the vertical line displayed in the interface 330 of one of the medical devices.

In the exemplary implementation shown in FIG. 3, there can be a charging device 210 that is capable of charging multiple medical devices 230 simultaneously. The charging device 210 can include at least one dock 310 (10 are shown in FIG. 3) that can each seat a medical device 230 and/or battery. The coupling between the medical devices 230 to the charging device 210 can be accomplished by a device coupler 320 that provides an electrical connection between the electrical supply directed to the corresponding dock 310 and the medical device 230.

In implementations in which there are multiple medical devices 230 being charged, a variety of methods can be used for determining which medical device 230 is most charged. In one implementation, the capability to determine the charge level can reside not in the charging device 210, but in the medical devices 230 themselves. Each of the medical devices 230 connected to the charging device 210 can receive the charge data corresponding to the other medical devices 230 connected to the charging device 210. The transmitting/receiving of charge data can be, for example, via the charging device 210 (via a hard-wired connection), BLE, NFC, infrared, WiFi, etc. The determination of the charge level of each medical device 230 can be determined, by each medical device 230, using the charge data. In this implementation, the displaying of the charge level, by each of the medical devices 230, can then be further based upon on the received charge data from the other medical devices 230. Examples of the displayed charge level are described in further detail in FIGS. 5-8.

In a related implementation, the capability to determine the charge level can reside in the charging device 210 and not in the medical devices 230. In this implementation, the charging device 210 can receive charge data from the medical devices 230. The charging device can then determine the charge level of the corresponding medical devices 230. The charging device 210 can then transmit at least one command to the medical devices 230 to cause the displaying of visual representations 340 of the charge state of the medical devices 230.

Figure 4:
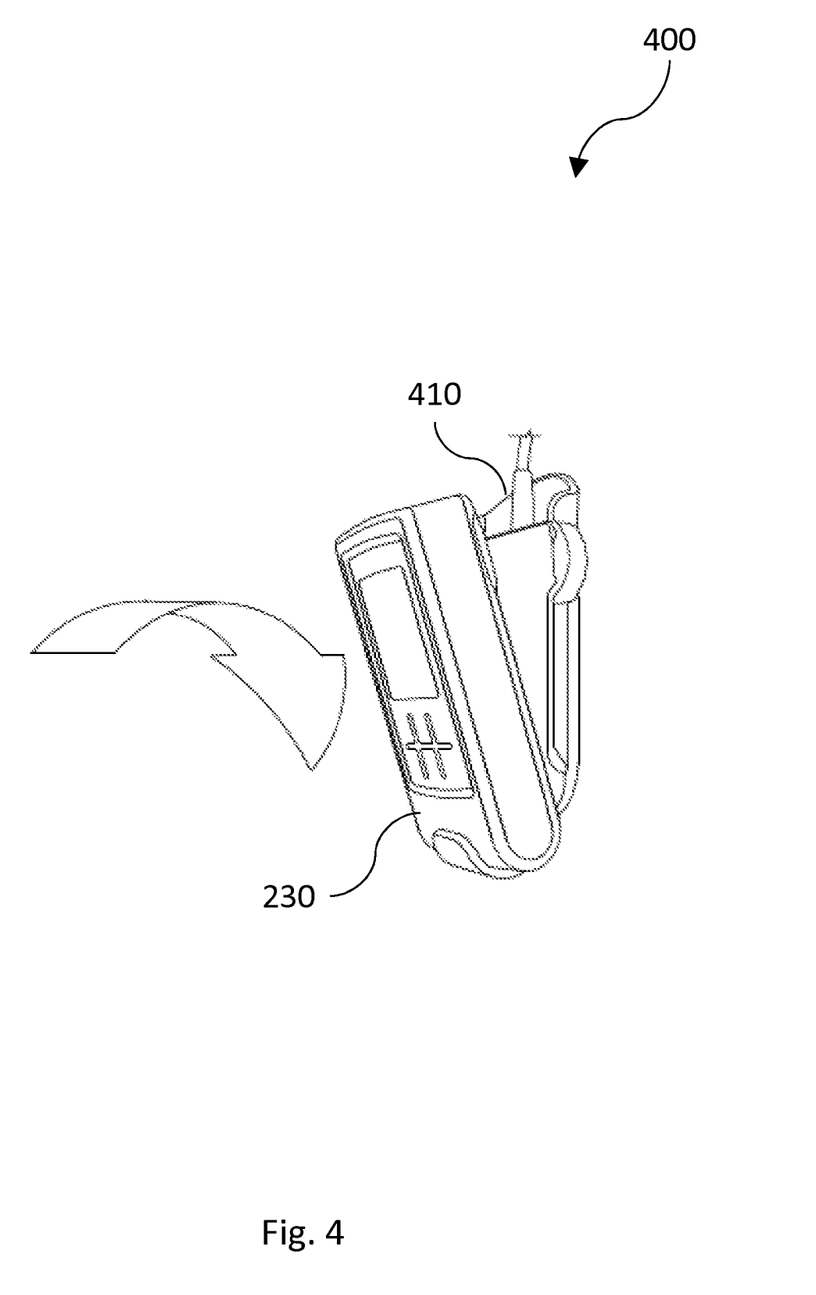
FIG. 4 is a diagram illustrating another implementation of a charging device having a single dock for a medical device.

FIG. 4 is a diagram 400 illustrating another implementation of a charging device 410 having a single dock 310 for a medical device 230. A charging device 410 can be for an individual medical device 230, or type of medical device 230, and can also be portable. In the implementation shown in FIG. 4, the charging device 410 can hang from a patient, a nearby piece of equipment, or be attached to a wall or other surface. Similar to that shown in FIG. 3, a medical device 230 can be placed within the charging device 410 and allowed to charge. The charging device 410 can include the same features and connectivity as any other implementation of the charging devices described herein.

Figure 5:
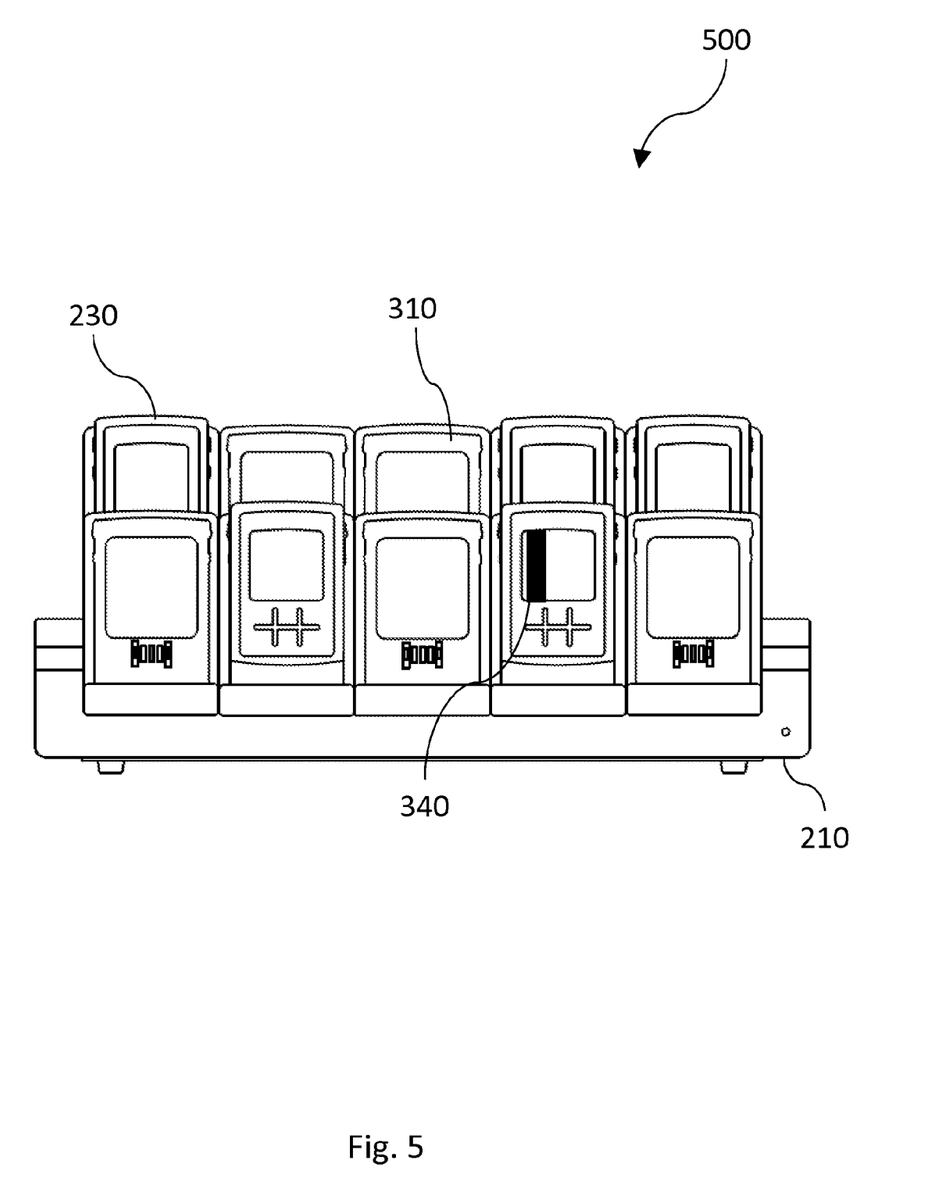
FIG. 5 is a diagram illustrating multiple medical devices in a charging device with a single fully charged medical device.

FIG. 5 is a diagram 500 illustrating multiple medical devices 230 in a charging device 210 with a single fully charged medical device 230. FIGS. 5-8 illustrate an exemplary sequence of charging multiple medical devices 230 and how the visual representation 340 can be displayed according to the charge level. As shown in FIGS. 5-8, for example, to increase the ease with which the most fully charged medical device 230 can be identified, the charge level of only the medical devices 230 that are fully charged are displayed via the visual representation 340. For example, as shown in FIGS. 5-8, if there are 5 devices charging and only one of them is fully charged, then the interfaces 330 on the other 4 can be blank, or otherwise display no visual representation 340 of the charge level. However, the fully charged medical device 230 can display the visual representation 340 as shown in FIG. 5. Another example is, if there are no fully charged medical devices 230, then the charge level of only the medical device 230 that is most charged is displayed by the visual representation 340.

To more easily distinguish the presence of a fully charged medical device 230, the appearance of the visual representation 340 can change when the medical device 230 reaches a fully charged state. The change in the appearance of the visual representation can be based on, for example, the charge level passing a threshold value. The threshold value can be any value corresponding to a fraction of the maximum stored energy of the battery, for example, 100%, 99%, 90%, 70%, etc. There can be a first threshold value, a second threshold value, and a third threshold value, any one of which can correspond to any particular charge level. In one implementation, the first threshold value can be 50% of the maximum stored energy of the battery, the second threshold value can be 75% of the maximum stored energy of the battery, and the third threshold value can be 100% of the maximum stored energy of the battery. However, any threshold value corresponding to 0% or 100% of a maximum stored energy of the battery should be understood to be only approximately 0% or 100%. The threshold values described herein can also include a range about the threshold. For example, the threshold value can include a range spanning, +/−1%, +/−2%, +/−5%, etc.

The appearance of the visual representation on the interface 330 can include, for example, an orientation, shape, color, a graphical design, a numerical indicator, or any combination thereof. Any or all of these features of the appearance of the visual representation can change depending on where the charge level is relative to any or all of the threshold values.

For example, an orientation of the visual representation 340 can change from a first (horizontal) orientation to a second (vertical) orientation (or vice versa) when such charge level is at or above a threshold value. The visual representation 340 can be horizontal on the interface 330 when the charge level is less than a threshold value of approximately 100% and vertical (as shown in FIG. 5) on the interface 330 when the charge level is equal to a threshold value of approximately 100%. In any of the described implementations, the visual representation 340 can sweep across the interface 330, for example left to right, top to bottom, diagonally, etc., and act as a screen saver for the interface 330.

Other features, color for example, of the visual representation 340 can also correspond to the charge level in any of the thresholds mentioned above. In one implementation, for each medical device 230, no visual representation 340 is displayed when the charge level is below the first threshold. In this implementation, the interface 330 is blank or displays other information. When the charge level is between the first threshold and the second threshold, inclusive, the visual representation 340 can include a line having a first color on the interface 330, as shown in FIG. 5. When the charge level is between the second threshold and the third threshold, the visual representation 340 can include the line having a second color on the interface 330. Finally, when the charge level is approximately at or greater than the third threshold, the visual representation 340 can include the line having a third color on the interface 330. In one implementation, the first color can be red, the second color can be yellow, and the third color can be green. The examples of colors used in the visual representation 340 are not intended to be exclusive. Any color can be used for any charge state of the medical device 230.

In another implementation, when the charge level is greater than one of the thresholds, for example, a second threshold corresponding to a charge level of 50%, the visual representation 340 can include a numerical indication 530 of the charge level proximate to the visual representation 340.

Figure 6:
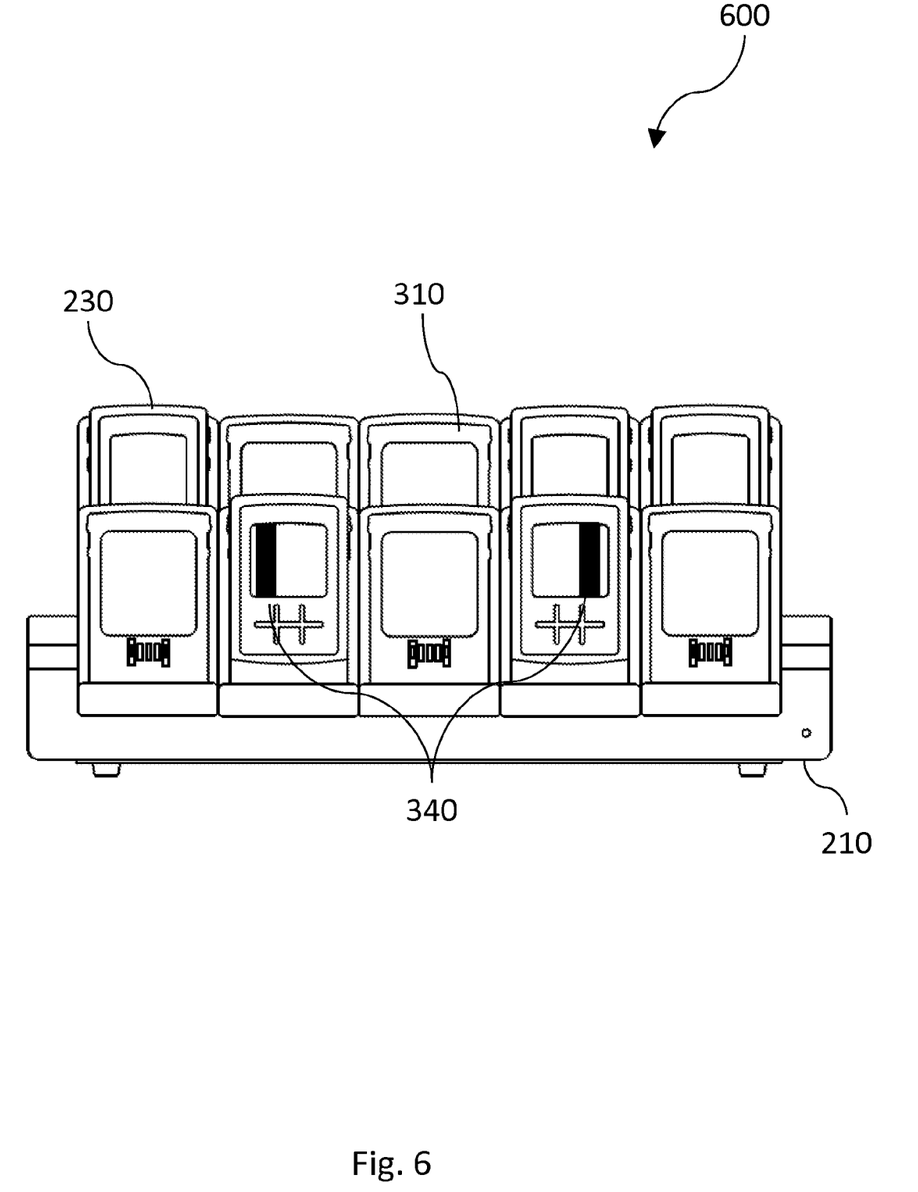
FIG. 6 is a diagram illustrating multiple medical devices in a charging device with two fully charged medical devices.
Figure 7:
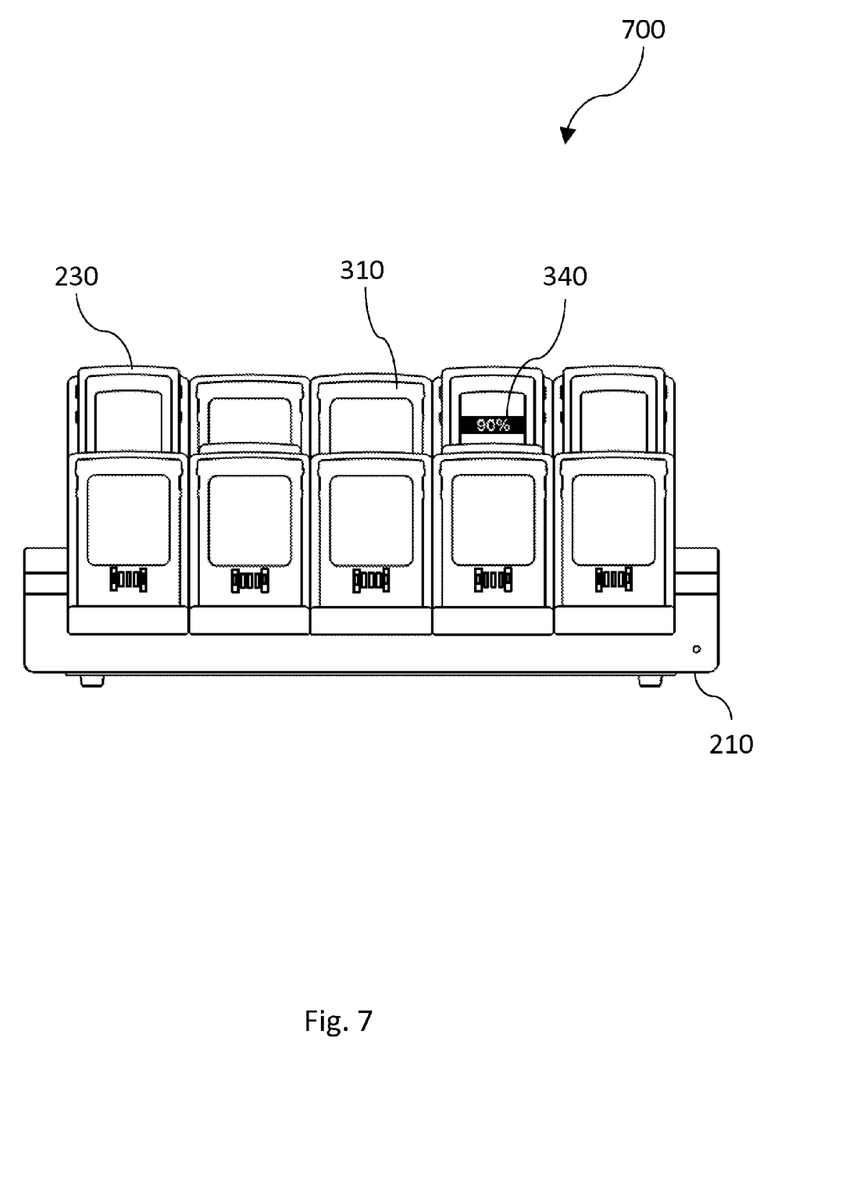
FIG. 7 is a diagram illustrating multiple medical devices in a charging device with a partially charged medical device.
Figure 8:
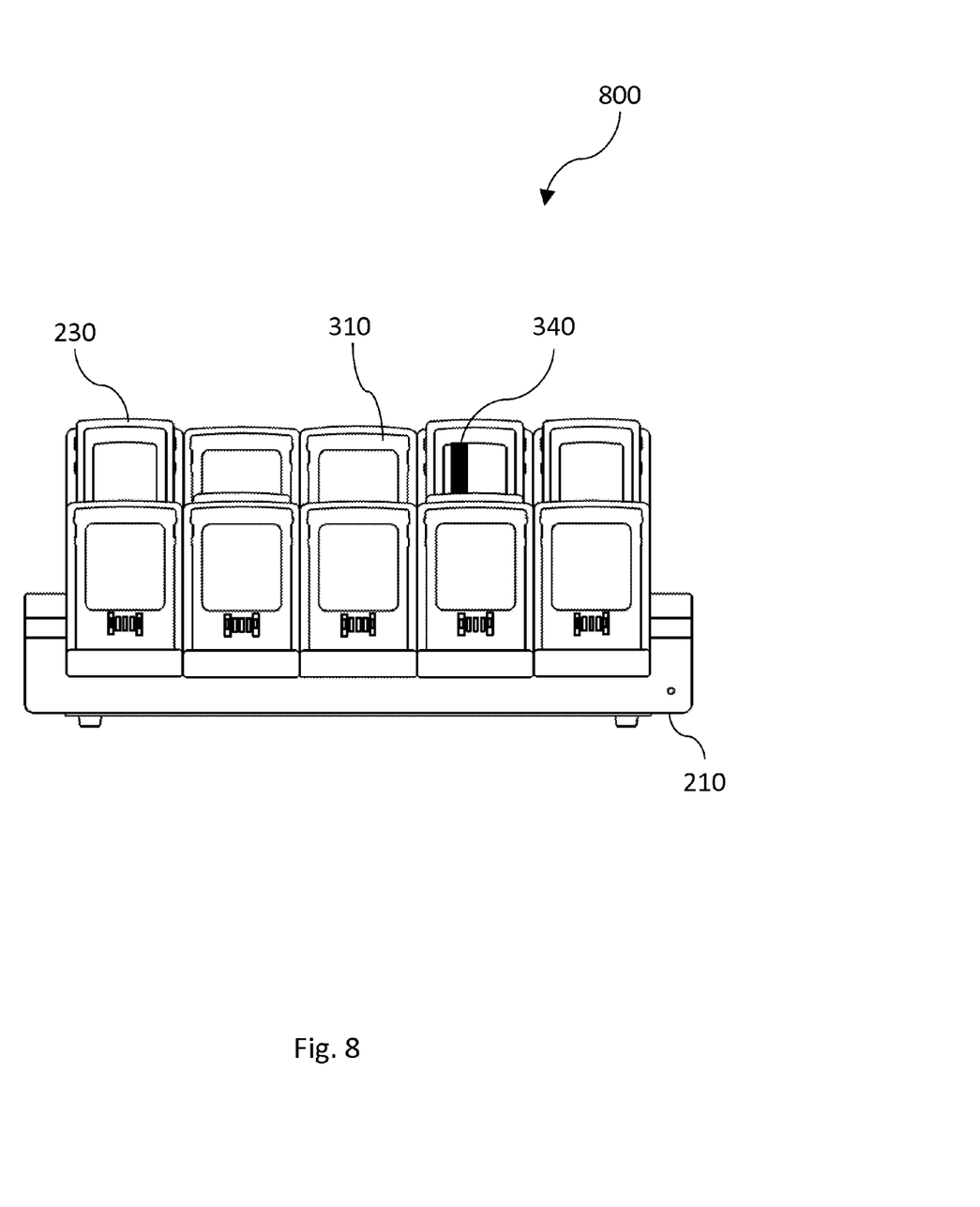
FIG. 8 is a diagram illustrating multiple medical devices in a charging device with a fully charged medical device.

FIG. 6 is a diagram 600 illustrating multiple medical devices 230 in a charging device 210 with a two fully charged medical devices. FIG. 7 is a diagram 700 illustrating multiple medical devices 230 in a charging device 210 with a partially charged medical device 230. FIG. 8 is a diagram 800 illustrating multiple medical devices 230 in a charging device 210 with a fully charged medical device 230. As shown in FIG. 6, at some time later than that shown in FIG. 5, a second medical device 230 can be fully charged and display the visual representation 340 in a vertical orientation on its interface 330. FIG. 7 shows yet another later time when the two fully charged medical devices 230 from FIG. 6 have been removed from the charging device 210. In this example, only the most charged medical device 230 displays a visual representation 340 of the charge level. Here, the visual representation 340 indicates a partially charged medical device 230. FIG. 8 is an example of yet a later time when the medical device 230 (from FIG. 7) is fully charged. The visual representation 340 has changed from the first (horizontal) orientation to the second (vertical) orientation. As was shown in FIG. 7, if the fully charged or most charged medical device 230 is removed from the charging device 210, then the above process can be applied to the remaining medical devices 230.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

The invention claimed is:

1. A method comprising:
    receiving, by a charging device, charge data from a device operatively connected to the charging device, the charge data corresponding to an amount of stored energy in a battery operatively connected to the device;
    determining a charge level for the device, based at least on the received charge data; and
    displaying, in an interface forming part of the device, the determined charge level such that a visual representation of the charge level is displayed in a first orientation when the charge level is less than a threshold value and the visual representation of the charge level is displayed in a second orientation when the charge level is greater than or equal to the threshold value.

2. The method of claim 1, wherein the device is a medical device configured to measure a physiological condition of a patient and facilitate a medical treatment for the patient.

3. The method of claim 1, wherein a visual appearance of the visual representation in the first orientation differs from a visual appearance of the graphical element in the second orientation.

4. The method of claim 1, wherein the threshold value is approximately 100% of the maximum stored energy of the battery.

5. The method of claim 1, wherein the visual representation is a line on the interface of the device.

6. The method of claim 5, wherein the line is horizontal on the interface of the device when the charge level is less than the threshold value and vertical on the interface of the device when the charge level is greater than or equal to the threshold value.

7. The method of claim 1, wherein there is a plurality of devices coupled to the charging device, and wherein only the devices that have charge levels that are greater than or equal to the threshold value display the visual representation.

8. The method of claim 1, wherein there is a plurality of devices coupled to the charging device, and wherein only the device that is most charged displays the visual representation.

9. The method of claim 1, wherein there is a plurality of devices coupled to the charging device, and wherein, for each of the devices, (i) when the charge level is below a first threshold value, no visual representation is displayed on the interface, (ii) when the charge level is between the first threshold value and a second threshold value, the visual representation includes a line having a first color on the interface, (iii) when the charge level is between the second threshold value and a third threshold value, the visual representation includes the line on the interface having a second color, (iv) when the charge level approximately at or greater than the third threshold value, the visual representation includes the line on the interface having a third color, and (v) when the charge level is greater than the first threshold value, the visual representation includes a numerical indication of the charge level proximate to the visual representation.

10. The method of claim 9, wherein the first color is red, the second color is yellow, and the third color is green.

11. The method of claim 1, wherein there is a plurality of devices coupled to the charging device,
    wherein the determining further comprises receiving, by each of the devices connected to the charging device, the charge data corresponding to the other devices connected to the charging device, and
    wherein the displaying, by each of the devices, is further based upon on the received charge data from the other devices.

12. The method of claim 1, wherein there is a plurality of devices coupled to the charging device, and at least a portion of the plurality of devices are connected by a network.

13. The method of claim 1, wherein there is a plurality of devices coupled to the charging device, and wherein the determining is by the charging device and wherein the displaying is based on at least one command received by the device from the charging device.

14. The method of claim 1, wherein the visual representation moves across the interface.

15. The method of claim 1, wherein the displaying is further based upon the charge level being approximately at or above at least one of a first threshold value, a second threshold value, and a third threshold value.

16. The method of claim 15, wherein the first threshold value is approximately 50% of the maximum stored energy of the battery, the second threshold value is approximately 75% of the maximum stored energy of the battery, and the third threshold value is approximately 100% of the maximum stored energy of the battery.

17. A method comprising:
    generating, by a medical device, charge data corresponding to an amount of stored energy in a battery operatively connected to the medical device;
    determining, by the medical device, a charge level for the medical device, based at least on the charge data; and displaying, in an interface forming part of the medical device, the determined charge level such that a visual representation of the charge level is displayed in a first orientation when the charge level is less than a threshold value and the visual representation of the charge level is displayed in a second orientation when the charge level is greater than or equal to the threshold value.

18. The method of claim 17, the visual representation comprising a line with an appearance that changes between the first orientation and the second orientation.

19. A method comprising:
receiving, by a charging device, charge data from a medical device operatively connected to the charging device, the charge data corresponding to an amount of stored energy in a battery operatively connected to the medical device;
determining a charge level for the medical device, based at least on the received charge data; and
displaying, in an interface forming part of the medical device, the determined charge level such that a visual representation of the charge level is displayed in a first orientation when the charge level is less than a threshold value and the visual representation of the charge level is displayed in a second orientation when the charge level is greater than or equal to the threshold value.

20. The method of claim 19, the visual representation comprising a line with an appearance that changes between the first orientation and the second orientation.

21. A system comprising:
at least one programmable processor; and
at least one memory storing instructions which, when executed by the processor, cause the at least one programmable processor to perform operations comprising:
receiving, by a charging device, charge data from a device operatively connected to the charging device, the charge data corresponding to an amount of stored energy in a battery operatively connected to the device;
determining a charge level for the device, based at least on the received charge data; and
displaying, in an interface forming part of the device, the determined charge level such that a visual representation of the charge level is displayed in a first orientation when the charge level is less than a threshold value and the visual representation of the charge level is displayed in a second orientation when the charge level is greater than or equal to the threshold value.

22. A system comprising:
at least one programmable processor; and
at least one memory storing instructions which, when executed by the processor, cause the at least one programmable processor to perform operations comprising:
generating, by a medical device, charge data corresponding to an amount of stored energy in a battery operatively connected to the medical device;
determining, by the medical device, a charge level for the medical device, based at least on the charge data; and
displaying, in an interface forming part of the medical device, the determined charge level such that a visual representation of the charge level is displayed in a first orientation when the charge level is less than a threshold value and the visual representation of the charge level is displayed in a second orientation when the charge level is greater than or equal to the threshold value.

23. A system comprising:
at least one programmable processor; and
at least one memory storing instructions which, when executed by the processor, cause the at least one programmable processor to perform operations comprising:
receiving, by a charging device, charge data from a medical device operatively connected to the charging device, the charge data corresponding to an amount of stored energy in a battery operatively connected to the medical device;
determining a charge level for the medical device, based at least on the received charge data; and
displaying, in an interface forming part of the medical device, the determined charge level such that a visual representation of the charge level is displayed in a first orientation when the charge level is less than a threshold value and the visual representation of the charge level is displayed in a second orientation when the charge level is greater than or equal to the threshold value.

* * * * *